(12) United States Patent
Bracegirdle

(10) Patent No.: US 6,855,440 B2
(45) Date of Patent: Feb. 15, 2005

(54) CONSTRUCTION MATERIAL, COMPOSITION AND PROCESS FOR PRODUCING THE SAME

(76) Inventor: Paul Bracegirdle, 9 Crimson Leaf Dr., Newtown, PA (US) 18940

( * ) Notice: Subject to any disclaimer, the term of this patent is extended or adjusted under 35 U.S.C. 154(b) by 0 days.

(21) Appl. No.: 10/358,211

(22) Filed: Feb. 5, 2003

(65) Prior Publication Data

US 2003/0148685 A1 Aug. 7, 2003

Related U.S. Application Data

(60) Provisional application No. 60/354,790, filed on Feb. 5, 2002.

(51) Int. Cl.$^7$ .............................................. B32B 19/00
(52) U.S. Cl. ....................... 428/702; 428/364; 428/428; 428/441; 428/446; 428/451; 428/454; 428/500; 428/515; 428/689; 428/702; 264/171.11; 264/173.16; 264/173.18; 264/176.1; 264/241; 264/280; 427/447; 427/453; 427/455; 427/180; 427/290; 106/638; 106/711; 106/712; 106/802; 524/442; 524/443; 524/494; 523/217
(58) Field of Search ................................ 428/364, 428, 428/441, 446, 451, 454, 510, 515, 689, 702, 171.1; 264/171.11, 173.16, 173.18, 176.1, 241, 280; 427/446, 447, 453, 455, 180, 289, 290; 106/638, 711, 712, 802; 524/442, 443, 494; 523/217

(56) References Cited

U.S. PATENT DOCUMENTS

| | | | |
|---|---|---|---|
| 5,030,662 A | 7/1991 | Banerjie | 521/43.5 |
| 5,212,223 A | 5/1993 | Mack et al. | 524/318 |
| 5,783,286 A | 7/1998 | DiNocola | 428/188 |
| 5,965,655 A | * 10/1999 | Mordecai et al. | 524/456 |
| 6,061,991 A | 5/2000 | Dahl | 52/720.2 |
| 6,153,293 A | 11/2000 | Dahl et al. | 428/310.5 |
| 6,374,555 B1 | 4/2002 | Gusler | 52/177 |
| 6,453,630 B1 | 9/2002 | Buhrts et al. | 52/177 |

OTHER PUBLICATIONS

"Foamed Recyclables." *Inventions & Innovation*, Office of Industrial Technologies, Energy Efficiency and Renewal Energy, U.S. Department of Energy, Jan. 2002.
"Technical Data—HDPE." U.S. Plastic Lumber Ltd., © USPL 2002.
"Technical Data—Structural Lumber (TriMax®)." U.S. Plastic Lumber Ltd., © USPL 2002.
Wagner, John D., "Decking Decisions—New options mean your next deck may not even be real wood." *This Old House Online*, © 2002 Time4 Media, Inc.
"Trex®–Physical and Mechanical Properties." http://www.trex.com/universal/technical_info/properties.asp. Trex Company, Inc. 2003.
"Trex®–Decking v. Wood v. Plastic." http://www.trex.com/universal/technical_info/materials.asp. Trex Company, Inc. 2003.

* cited by examiner

Primary Examiner—Deborah Jones
Assistant Examiner—Wendy Boss
(74) Attorney, Agent, or Firm—Blank Rome LLP

(57) ABSTRACT

A construction product made from an extrudable composition formed into various shapes for use in deck-building systems and other applications is disclosed. The extrudable composition prepared from polyethylene polymeric compounds, such as HDPE, and mixed with a mineral such as fiberglass, mineral wool or sand, along with a pigment, has sufficient strength and other advantageous properties to be useful for those construction applications.

24 Claims, 1 Drawing Sheet

CONSTRUCTION MATERIAL, COMPOSITION AND PROCESS FOR PRODUCING THE SAME

PRIORITY STATEMENT

This application claims priority to U.S. Provisional Patent Application No. 60/354,790, filed Feb. 5, 2002, which is incorporated herein in its entirety.

BACKGROUND OF THE INVENTION

1. Field of Invention

The present invention relates generally to materials used for construction products. More particularly, the present invention relates to synthetic products made with improved features for a wider range of construction applications.

2. Description of the Prior Art

Construction members are available in a variety of natural, synthetic and composite materials, each of which has advantages and disadvantages depending on the specific application. Pressure-treated wood, for example, is economical and plentiful and lasts many years when properly and routinely treated with water repellent. Unfortunately, wood lumber can crack and splinter as it dries, change color over time and the sawdust can adversely impact human health and the environment depending on the compounds used to treat the wood.

An alternative to wood lumber is a composite material made from wood and plastic. For example, U.S. Pat. No. 6,153,293, Extruded Wood Polymer Composite and Method of Manufacture, describes extruded composite artificial lumber products manufactured from wood fiber and polyethylene. That patent also cites and discusses other patents disclosing structural members made from composite wood and plastic. Composites made of wood and plastic exhibit good strength, having a modulus of elasticity close to 175,000 pounds per square inch (ASTM D4761), they are economical to make, can be stained like wood and provide a relatively high coefficient of friction for mitigating slips. Moreover, structures made from composite materials resist rot, insects and ultraviolet radiation, are splinter free and easy to work with. In addition, the coefficient of thermal expansion for composites can be nearly half that compared to structural members made from just plastic. Some of the disadvantages of composite wood/plastic materials include a plastic appearance, colors can fade and the sawdust is not biodegradable. Further, composite materials may not be as strong as wood lumber and require closer joist spacing for decks. Carefree Composite® products, available from U.S. Plastic Lumber, are examples of composite structural members made from wood and recycled plastic.

Another alternative to wood lumber is a composite material made from plastics and certain chemical additives. For example, U.S. Pat. No. 5,030,662, Construction Material Obtained from Recycled Polyolefins Containing Other Polymers, describes composite artificial lumber products made from recycled polyolefins with additives such as reinforcing agents, impact modifiers and other materials. Depending on the plastic and additives used, they can exhibit good strength, having a modulus of elasticity (MOE) approaching 400,000 pounds per square inch (ASTM D198). They are also significantly stronger than just pure plastic materials without additives. However, composites made from recycled plastics and various chemical additives are generally more expensive than composites made from wood and plastic materials. Further, the strength of many composite plastic materials is lower than wood timber in good condition and, therefore, requires closer supports or joist spacing for decks. TRIMAX® products, also available from U.S. Plastic Lumber, are examples of structural members made from composite recycled plastics with chemical additives.

Notwithstanding the above, there are many applications where pure plastic structural members are desired because of certain advantages over other materials used for structural members. One of the primary materials used to manufacture artificial dimensional lumber products, for example, is high-density polyethylene (HDPE). Virgin HDPE is manufactured from petroleum fractions and is a relatively low-cost material, making it an attractive substitute for wood, composite wood/plastic and composite plastics/additives materials. Recycled HDPE is even more cost effective to use due in part to the availability of large quantities of the recycled materials.

Because HDPE products are made with a single, purified polymer, they can be manufactured to exacting, reproducible specifications. HDPE is also easily molded or extruded into a variety of shapes, including planks, posts, rails, balusters, and tongue and groove dimensional lumber. Construction products made with HDPE have exceptional resistance to corrosive substances, oil and fuels, insects, fungi, salt spray, and other environmental stresses. Moreover, HDPE products do not absorb moisture; therefore they will not rot, splinter or crack under most conditions.

Furthermore, HDPE can be colored with pigments, which are mixed with the HDPE before it is molded or extruded into its final dimensional lumber form, making it attractive for certain residential, commercial and industrial applications such as flooring planks on outdoor decks. Moreover, HDPE is reasonably strong at the temperatures to which it is ordinarily exposed.

Notwithstanding those advantages of HDPE as a material for construction members, HDPE has a lower modulus of elasticity and therefore less stiffness than wood lumber. For example, HDPE has a coefficient of thermal expansion of about $5.5 \times 10^{-5}$ to $6 \times 10^{-5}$ inches/inch-° F. That can translate into a change of length of a 10-foot deck plank of about one inch over a temperature change from 0° F. to 140° F. (the upper end of that range being observable in a product directly exposed to summer sun). Such significant length changes in a structure can result in excess stress on mounting members and fasteners, and warping and misalignment of structures employing such members.

Also, HDPE can discharge static electrical charges. Additives like Atmer® 129 by SpecialChem Company can be added to HDPE to mitigate the static electricity problem. In addition, HDPE loses over 30-percent of its flexural strength when heated from 70° F. to 120° F., thereby lowering its allowable live load. That requires the use of significantly larger structures or use of smaller spans (i.e., joists spaced closer together) compared to wood products. Moreover, HDPE is relatively slippery when wet, based on its coefficient of friction. Adding longitudinal (and traverse) ridges during the extrusion process, which has been a traditional method of increasing the coefficient of friction on the product surface, can generate an exaggerated risk of slides and falls under certain circumstances.

Accordingly, HDPE it is not always recommended for use as a true structural member in many applications. For example, HDPE by itself is not recommended for use in load-bearing walls, deck framing and floor joists. To overcome some of those problems, additives have been mixed with HDPE to improve it properties, included the addition of acrylics that increase notch sensitivity to fracture.

SUMMARY AND OBJECTS OF THE INVENTION

In view of the foregoing, it should be apparent that there exists a need in the art for a structural member made from polymeric materials that overcome some of the disadvantages exhibited by HDPE alone.

It is, therefore, a primary object of the present invention to provide a structural or plank member made primarily from HDPE that has better thermal expansion properties, strength, and grip and also less static electricity compared with previous HDPE structural members.

More particularly, it is an object of the present invention to provide a structural or plank member made primarily from HDPE that has a coefficient of thermal expansion that is lowered by as much as about fifty-percent to reduce contraction and elongation of the member due to temperature change.

Still more particularly, it is object of the present invention to provide a structural or plank member made primarily from HDPE that has a modulus of elasticity that is increased by as much as about ten percent to reduce deflection under load and thereby allow for the use of less material.

Still more particularly, it is object of the present invention to provide a structural member made primarily from HDPE that has reduced electrical voltage to reduce static electrical discharges.

Still more particularly, it is object of the present invention to provide a structural member made primarily from HDPE that has a coefficient of static friction that is increased by as much as about ten percent or greater to increase grip and reduce slippage.

Another object of the present invention is to provide a material for use as a structural member that can be formed in a mold or by an extrusion process.

Briefly described, these and other objects and features of the present invention are accomplished, as embodied and fully described herein, by their apparatus aspect that includes an extrudable composition for making a structural product made from a mixture having about 90 to 95-percent, based on the total weight of the mixture, of a thermoplastic polyethylene-type polymeric compound like HDPE, and about 5 to 10-percent, based on the total weight of said mixture, of a mineral such as fiberglass minerals, mineral wool, and sand minerals, such that the extrudable composition, when formed into a cured structural product, has a coefficient of thermal expansion of no greater than about $3 \times 10^{-5}$ inches/inch-° F.

Moreover, the above cited and other objects and features of the present invention are accomplished by a process for manufacturing a composite structural product by introducing into an extruder and extruding therefrom the aforementioned composition; introducing said composition into a die having an established dimensional profile; forming from said die a structural product; and adding a layer on at least a portion of the structural product in such a way that the material or materials forming the layer fuse to the structural product and cause the covered portion to become roughened by the presence of the material or materials. The process also can involve adding to the composition a pigment before extruding the composition and cutting the structural product into pieces before the step of adding the layer to the structural product. The layer may be formed by flame-spraying particles onto the surface of the structural product.

With these and other objects, advantages and features of the invention that may become hereinafter apparent, the nature of the invention may be more clearly understood by reference to the following detailed description of the invention, the appended claims and to the several drawings attached herein.

DETAILED DESCRIPTION OF THE PREFERRED EMBODIMENT

Figure 1:
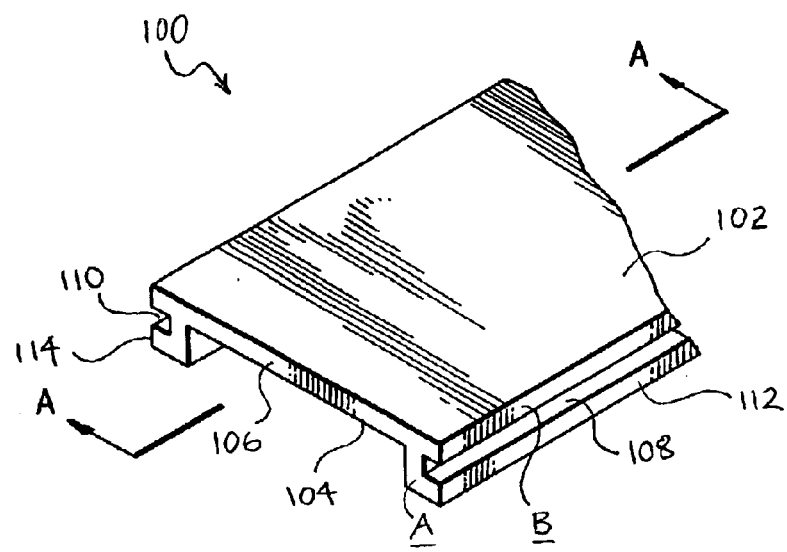
FIG. 1 is a partial perspective view of a structural member made from a composite material of the present invention.

One preferred embodiment of the invention is described for illustrative purposes, it being understood that the invention may be embodied in other forms not specifically shown in the drawings or described hereinafter.

Referring now in detail to the drawings, wherein like parts are designated by like reference numerals throughout, FIG. 1 is a partial perspective view of a structural member 100 made from a composite material as described in detail below. The structural member 100 is a deck plank having a fastening portion A and an integral fascia portion B. It will be obvious to one of ordinary skill in the art that structural member 100 could be any shape, including, but not limited to a post, rail, baluster, step, casing or molding without deviating from the nature and scope of the invention.

The structural member 100, regardless of its form, is most useful for outdoor construction, including but not limited to decking systems. As a deck plank, the structural member 100 can be produced in various dimensions, typically in 8, 10, 12 and 16-foot lengths and 4 and 6-in. widths, which are standard sizes for most decking applications.

In FIG. 1, the fascia portion B has a top surface 102, a bottom surface 104, and an end portion 106 (another end portion opposite the end portion 106 is not shown). The fastening portion A has grooves 108, 110 along both side edges of the fascia portion B and tongues 112, 114. One or both of the grooves 108, 110, could instead be a tongue and one or both of the tongues 112, 114 could be a groove. The tongue and groove structure provides for secure and nearly seamless joining of adjacent structural members. Of course, any system for fastening the structural member 100 to another structural member or to a support device, such as a joist, is contemplated, depending upon whether the structural member 100 is a post, rail, baluster, step, casing, molding or other device.

The composite material making up structural member 100 is preferably a virgin or recycled polymeric compound, most preferably HDPE. A structural member 100 made with HDPE has exceptional resistance to corrosive substances, oil and fuels, insects, fungi, salt spray, and other environmental stresses. Moreover, they absorb little moisture and will resist rotting, splintering or cracking under most conditions. Thus, the material is ideal for certain structural applications, including those listed above.

However, the aforementioned HDPE material combined with about 5-percent to about 10-percent, by weight, of a reinforcing filler, preferably fiberglass or other mineral fibers, makes a composite material that has been found to be an improvement over pure HDPE structural members. For example, the composite material having fiberglass or other mineral fibers reduces the coefficient of thermal expansion from approximately $6 \times 10^{-5}$ inches/inch-° F. to approximately $3 \times 10^{-5}$ inches/inch-° F. That change represents a reduction of 50-percent the contraction and elongation of the structural member 100 due to temperature changes.

Also, the composite material having fiberglass or other mineral fibers increases the modulus of elasticity by at least 10-percent. That change reduces the deflection of the structural member 100 under a load and thereby allows for the use of smaller sized structural members 100 for a given span, load and deflection. Furthermore, the composite material having fiberglass or other mineral fibers reduces voltage and thereby static electricity discharges. Moreover, the composite material having fiberglass or other mineral fibers increases the coefficient of friction of surfaces by at least 10 percent, and preferably 80 percent. That change reduces the potential for slipping or loosing grip on the structural member 100.

Another substance that could be used by itself or in combination with fiberglass in the composite mixture is a substance classified under the category of mineral wool and minerals such as sand.

Figure 2A:
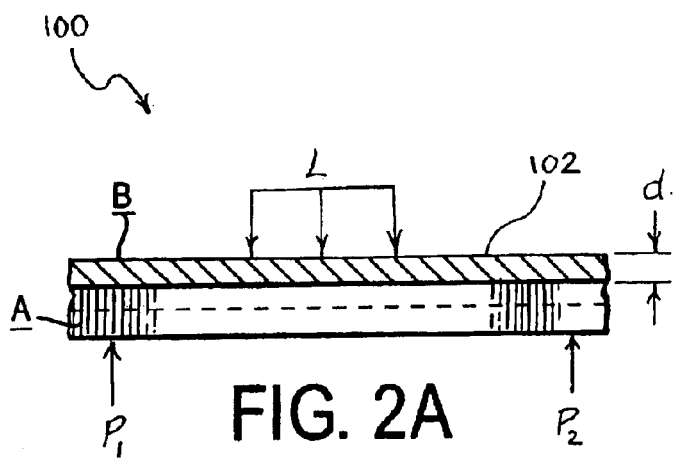
FIG. 2A is a partial cross-sectional elevation view of the structural member of FIG. 1 taken along line A—A.

Referring now to FIG. 2A, shown therein is a partial cross-sectional elevation view of the structural member of FIG. 1, taken along line A—A, showing the fastening portion A and the fascia portion B. As noted above, the embodiment shown in FIG. 2A is a deck plank. The increased strength of the material of the present invention allows for the thickness d of the fascia portion B to be reduced to a minimum value while still providing adequate flexural support for a point or distributed force L applied to the structural member 100 between point support forces $P_1$ and $P_2$. An object, such as a person, having a defined mass and placed in contact with the top surface 102 could produced the load L as indicated. The forces $P_1$ and $P_2$ could be produced, for example, by a post or joist in contact with the bottom of the fastening portion A that supports the structural member 100.

The increased strength of the composite material also resists compressive and tensile forces applied to the structural member 100; for example, if the structural member 100 were oriented vertically and received a compressive load.

According to the invention, the methods of making the structural member 100 involves several techniques. As a starting point, virgin HDPE, which is manufactured from petroleum fractions, or recycled HDPE, is obtained. Traditional thermoplastic molding and/or extrusion techniques may be employed to form the raw HDPE into the shape of the structural member 100 to exacting, reproducible specifications. The individual structural members 100 can also be die-cut from sheets of HDPE composite material.

Prior to forming, about 5 to 10-percent of a mineral, such as fiberglass, is admixed with the liquefied HDPE prior to final forming or extrusion.

Figure 2B:
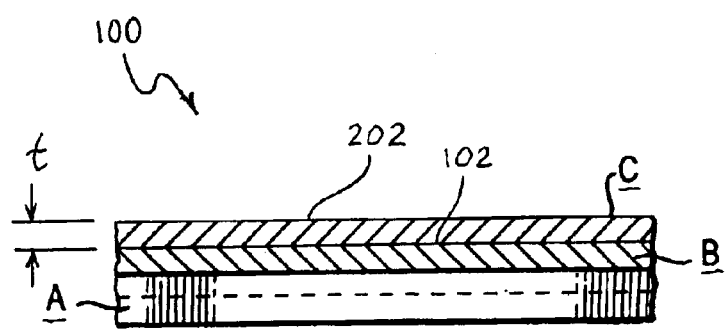
FIG. 2B is the partial cross-sectional elevation view shown in FIG. 2 showing a film layer added to the top of the structural member.

After forming the structural member 100, a layer 202 may be added to the top surface 102 of the structural member 100 as depicted in FIG. 2B. In FIG. 2B, which is a partial cross-sectional elevation view of the structural member of FIG. 1 taken along line A—A, the layer 202 covers the top surface 102 of the fascia portion B. The layer 202 is preferably added to the top surface 102 by an extruction coating process using, for example, a flame spraying technique. In that technique, particles of HDPE are directly applied on the surface of the formed structural member 100.

For example, particles of HDPE can be flame sprayed onto an extruded structural member 100 in a subsequent step after the structural member 100 is initially formed.

Flame spraying is a thermal coating process well known in the art. Flame spraying involves a source material that is applied to a surface by an application device, such as a gas-assisted spray gun. The source material is first heated, atomized or otherwise broken up either in the source bin or during transport through the application device, and then propelled onto a substrate to form the coating. The application device may further heat the source material in a combustion zone just before discharging the source material. In flame spraying, the particle velocity at the application discharge is relatively low compared to other deposition methods, such as plasma spraying, and is on the order of about 10 to 50 meters per second. That relatively low rate translates to a relatively low deposition rate on the surface of the object being coated. The process results in a coating having a relatively high porosity, on the order of about 10 to 15-percent, which is desirable in many applications.

In the present invention, flame spraying is the preferred technique for coating the top surface 102 to form the layer 202. Preferably, the HDPE particles added to the top surface 102 are no larger than about 50 mesh (about 0.0234 inches, based on the particle's aerodynamic diameter or actual linear dimensions), and preferably fall within the range of about 30 to 50 mesh (about 0.0117 to 0.0234 inches). However, other particles sizes may be used for the following reason.

The flame-spraying technique is done at a temperature sufficiently high so that flame-sprayed HDPE particles partially fuse into the formerly smooth top surface 102 of the structural member 100, thereby creating a roughened surface that has a greater resistance to sliding. The thickness t of the layer 202 depends on the deposition rate and amount of time the structural member 100 is exposed to the flow of particles discharged from the application device. The value of t should be such that the coefficient of friction is increased about 10 to 80 percent or greater compared to the non-coated top surface 102. Thus, the actual particle size of the flame-sprayed HDPE particles may be smaller or larger than about 30 to 50 mesh, as long as the resulting coefficient of friction is increased by the amount as noted above. The extruction coating process of the invention preferably creates a thickness t of the layer 202 of about 0.002 to 0.005 inches.

It should be noted, however, that the layer 202 does not have to be a continuous layer across the top surface 102 of the fascia B as depicted in FIG. 2B. Further, the thickness t does not have to be uniform or constant. For example, the layer 202 could be a row having a finite width and spanning all or a portion of the fascia B at a discrete location. It could be separated from another layer portion by a section of the fascia B that has no surface treatment layer. The layer 202 can also be applied in a decorative manner. One of the layer portions may also be thicker than the other layer portions. Thus, the layer 202 could have a thickness t that is greater than the thickness of another layer portion.

Other types of source materials may be used to form the layer 202 instead of HDPE. For example, other polymers and minerals could be used, including, but not limited to minerals generally classified under the category of mineral wool and sand. Metallic particles or metal oxides could also be used. Obviously, metal oxides can be produced from a metallic source material in the combustion zone of the application device and then applied on the top surface 102 of the facsia B.

Also, other coating techniques could be used instead of flame spraying. One such technique is plasma spraying, which, like flame-spraying, is generally well known in the art as a coating process.

During the step of forming the structural member 100, the HDPE can be colored with pigments. Pigments, like titanium dioxide, are admixed with the HDPE before it is molded or extruded into its final dimensional form. Adding white or color pigments makes attractive color choices for certain residential, commercial and industrial applications such as flooring planks on outdoor decks.

Table 1 summarizes various composite materials for use in manufacturing the structural member 100 of the present invention. Table 2 summarizes various structural members made from the composites listed in Table 1. Table 3 lists some of the properties of the composites listed in Table 1.

TABLE 1

|  | Composition | | |
| --- | --- | --- | --- |
| Ingredient | A | B | C |
| HDPE | 90–95% | 90–95% | 90–95% |
| Mineral fiberglass | 5–10% | | |
| Minerals of mineral wool | | 5–10% | |
| Minerals of sand | | | 5–10% |
| Pigment* | 1–3% | 1–3% | 1–3% |

*One or more pigments, such as certain metal oxides, may also be added for color or to brighten the composite material and are added in an amount shown relative to the combined weight of other ingredients to form a feedstock.

TABLE 2

| Structural Member | Composite | Coating Source Material | Final Approximate Thickness (in.) |
| --- | --- | --- | --- |
| 1 | A | HDPE | 0.002 to 0.005 |
| 2 | B | Non-HDPE plastic, mineral, metal and/or metal oxide | 0.002 to 0.005 |
| 3 | C | Non-HDPE plastic, mineral, metal and/or metal oxide | 0.002 to 0.005 |

TABLE 3

| Composite | Approximate Coefficient of Thermal Expansion (in/in-° F.) (ASTM E228) | Coefficient of Sliding Friction (Tribometer ASTM F^ 1679) |
| --- | --- | --- |
| A | $5 \times 10^{-5}$ | 0.5 |
| B | $3 \times 10^{-5}$ | 0.75 |
| C | $3 \times 10^{-5}$ | 0.75 |

Although only preferred embodiments are specifically illustrated and described herein, it will be appreciated that many modifications and variations of the present invention are possible in light of the above teachings and within the purview of the appended claims without departing from the spirit and intended scope of the invention.

I claim:

1. A process for manufacturing a composite structural product having an established exterior dimensional profile and made from thermoplastic and other materials, the process comprising the steps of:

forming a feedstock, to which a mineral is blended, by mixing about 1 to 3 percent, based on the total weight of said feedstock, of a pigment with a thermoplastic polyethylene-type polymeric compounds;

introducing into an extruder at an effective temperature and extruding therefrom a blended homogeneous mixture having about 90 to 95 percent, based on the total weight of said mixture, of said thermoplastic polyethylene-type nolymeric compound, and having about 5 to 10 percent, based on the total weight of said mixture, of said mineral, and said pigment;

introducing said extruded homogeneous mixture into a die having an established dimensional profile; and forming from said die a structural product.

2. The process according to claim 1, further comprising the step of adding a layer on at least a portion of said structural product in such a way that the material or materials forming said layer fuse to said product and cause said portion to become roughened by the presence of said material or materials.

3. The process according to claim 2, further comprising the step of cutting said structural product into pieces before the step of adding said layer to said structural product.

4. The process according to claim 1, wherein said mineral is selected from the group consisting of fiberglass minerals, mineral wool, and sand minerals.

5. The process according to claim 2, wherein said material forming said layer is selected from the group consisting of a polymeric compound, polymeric polyethylene compound, sand minerals, metal particles, and metal oxide particles.

6. The process according to claim 2, wherein said mineral is fiberglass and wherein said material or materials forming said layer is high-density polyethylene.

7. The process according to claim 2, wherein said layer is formed by an extruction coating process.

8. The process according to claim 2, wherein said layer is formed by flame-spraying particles onto the surface of said structural product.

9. The process according to claim 1, wherein said structural product is one of a plank, post, rail, baluster, step, casing or molding.

10. The process according to claim 1, wherein said structural product comprises at least a fastening portion and a fascia portion.

11. A process for manufacturing a composite structural product having an established exterior dimensional profile and made from thermoplastic and other materials, the process comprising the steps of:

introducing into an extruder at an effective temperature and extruding therefrom a blended homogeneous mixture having about 90 to 95 percent, based on the total weight of said mixture, of a thermoplastic polyethylene-type polymeric compound, and having about 5 to 10 percent, based on the total weight of said mixture, of a mineral selected from the group consisting of fiberglass minerals, mineral wool, and sand minerals;

introducing said extruded homogeneous mixture into a die having an established dimensional profile;

forming from said die a structural product; and adding a layer on at least a portion of said structural product in such a way that the material or materials forming said layer fuse to said product and cause said portion to become roughened by the presence of said material or materials and wherein said material is selected from the group consisting of a polymeric compound, polymeric polyethylene compound, sand minerals, metal particles, and metal oxide particles.

12. The process according to claim 11, further comprising the step of forming a feedstock, to which said mineral is blended, by mixing about 1 to 3 percent, based on the total weight of said feedstock, of a pigment with said polymeric compound.

13. The process according to claim 11, further comprising the step of cutting said structural product into pieces before the step of adding said layer to said structural product.

14. The process according to claim 11, wherein said mineral is fiberglass and wherein said material forming said fused layer is high-density polyethylene.

15. The process according to claim 11, wherein said layer is formed by flame-spraying particles onto the surface of said structural product.

16. The process according to claim 11, wherein said structural product is one of a plank, post, rail, baluster, step, casing or molding.

17. The process according to claim 11, wherein said structural product comprises at least a fastening portion and a fascia portion.

18. An extrudable composition for making a structural product, comprising a blended mixture of:

about 90 to 95 percent, based on the total weight of said mixture, of a thermoplastic polyethylene-type polymeric compound; and about 5 to 10 percent, based on the total weight of said mixture, of a mineral selected from the group consisting of fiberglass minerals, mineral wool, and sand minerals, wherein said extrudable composition formed into a cured structural product has coefficient of thermal expansion of no greater than $3 \times 10^{-5}$ inches/inch-° F.

19. The extrudable composition according to claim 18, wherein said polymeric compound is high-density polyethylene.

20. A process for manufacturing a composite structural product having an established exterior dimensional profile and made from thermoplastic and other materials, the process comprising the steps of:

introducing into an extruder at an effective temperature and extruding therefrom a homogeneous mixture having about 90 to 95 percent, based on the total weight of said mixture, of a thermoplastic polyethylene-type polymeric compound, having about 5 to 10 percent, based on the total weight of said mixture, of a mineral, and having about 1 to 3 percent, based on the total combined weight of said thermoplastic polyethylene-type polymeric compound and said mineral, of a pigment;

introducing said extruded homogeneous mixture into a die having an established dimensional profile; and forming from said die a structural product.

21. A structural product comprising:

a structural member having a first surface spaced apart and opposing a second surface and a flange disposed on at least one edge of said first surface, wherein said structural member is made from a composite mixture formed by introducing into an extruder at an effective temperature and extruding therefrom a homogeneous mixture having about 90 to 95 percent, based on the total weight of said mixture, of a thermoplastic polyethylene-type polymeric compound, having about 5 to 10 percent, based on the total weight of said mixture, of a mineral, and having about 1 to 3 percent, based on the total combined weight of said thermoplastic polyethylene-type polymeric compound and said mineral, of a pigment.

22. The structural product according to claim 21, further comprising a layer on at least a portion of said first surface, wherein said layer is formed in such a way that the material or materials forming said layer fuse to said structural member and cause said portion to become roughened by the presence of said material or materials.

23. The structural product according to claim 21, wherein said flange comprises at least a fastening portion and a fascia portion.

24. The structural product according to claim 21, wherein said structural member is one of a plank, post, rail, baluster, step, casing or molding.

* * * * *